United States Patent
Liu et al.

(10) Patent No.: US 9,749,151 B2
(45) Date of Patent: Aug. 29, 2017

(54) TUNNELING WITH ROUTING FOR TRANSPORT NETWORK

(71) Applicant: T-Mobile USA, Inc., Bellevue, WA (US)

(72) Inventors: Chunming Liu, Bellevue, WA (US); Bryan Fleming, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 119 days.

(21) Appl. No.: 14/575,338

(22) Filed: Dec. 18, 2014

(65) Prior Publication Data
US 2016/0182255 A1    Jun. 23, 2016

(51) Int. Cl.
*H04L 12/54* (2013.01)
*H04L 12/46* (2006.01)
*H04L 12/715* (2013.01)

(52) U.S. Cl.
CPC ........ *H04L 12/5689* (2013.01); *H04L 12/465* (2013.01); *H04L 12/4633* (2013.01); *H04L 12/4645* (2013.01); *H04L 45/04* (2013.01); *H04L 2212/00* (2013.01)

(58) Field of Classification Search
CPC ............ H04L 12/5689; H04L 12/4645; H04L 2012/5617; H04L 12/4633; H04L 12/465; H04L 45/04; H04L 2212/00
USPC .... 370/254, 310, 328, 338, 351, 389, 395.1, 370/396, 397, 398, 399, 464, 465, 470, 370/471
See application file for complete search history.

(56) References Cited

U.S. PATENT DOCUMENTS

| | | |
|---|---|---|
| 5,132,961 A | 7/1992 | Thiebaut et al. |
| 6,912,575 B1 | 6/2005 | Swift et al. |
| 8,542,586 B2 | 9/2013 | Chen et al. |
| 2004/0184477 A1 | 9/2004 | Tavli et al. |
| 2008/0002720 A1 | 1/2008 | Chao et al. |
| 2010/0208588 A1 | 8/2010 | Vinokour et al. |
| 2010/0220724 A1 | 9/2010 | Rabie et al. |

(Continued)

FOREIGN PATENT DOCUMENTS

| | | |
|---|---|---|
| WO | WO2008022459 A1 | 2/2008 |
| WO | WO2010051242 A1 | 5/2010 |
| WO | WO2014089770 A1 | 6/2014 |

OTHER PUBLICATIONS

PCT Search Report and Written Opinion mailed Mar. 25, 2016 for PCT Application No. PCT/US15/65030, 9 pages.

(Continued)

*Primary Examiner* — Obaidul Huq
(74) *Attorney, Agent, or Firm* — Lee & Hayes, PLLC (57) ABSTRACT

Methods and computing systems for tunneling in a carrier transport network are described. An Internet Protocol (IP) packet having a destination IP address of a destination cellular site of a cellular cluster is received. A frame is formed with the IP packet placed into a payload portion of the frame. An outer Virtual Local Area Network (VLAN) tag that identifies a network of the cellular cluster to a first carrier network is added to the frame, and an inner VLAN tag that identifies the network of the cellular cluster to a second carrier is added. The first carrier network and the second carrier network are coupled via at least one network-to-network interface. The frame, including the IP packet, is forwarded to a provider edge switch of the first carrier network.

14 Claims, 4 Drawing Sheets

(56) References Cited

U.S. PATENT DOCUMENTS

| | | | |
|---|---|---|---|
| 2010/0220731 A1* | 9/2010 | Diab | H04L 12/4641 |
| | | | 370/395.53 |
| 2011/0058656 A1 | 3/2011 | Hartwich et al. | |
| 2011/0200017 A1 | 8/2011 | Amalfitano | |
| 2012/0013748 A1 | 1/2012 | Stanwood et al. | |
| 2012/0027014 A1 | 2/2012 | Mack-Crane et al. | |
| 2013/0121261 A1 | 5/2013 | Yao et al. | |
| 2013/0142055 A1 | 6/2013 | Bao et al. | |
| 2013/0223287 A1* | 8/2013 | Ahmad | H04L 12/465 |
| | | | 370/255 |
| 2013/0275597 A1 | 10/2013 | Feng et al. | |
| 2014/0082193 A1 | 3/2014 | Bugenhagen | |
| 2014/0177840 A1 | 6/2014 | Liu | |
| 2014/0233423 A1 | 8/2014 | Jha et al. | |
| 2015/0188773 A1* | 7/2015 | DeCusatis | G06F 9/45558 |
| | | | 370/254 |
| 2016/0014634 A1 | 1/2016 | Liu et al. | |
| 2016/0183118 A1 | 6/2016 | Liu et al. | |

OTHER PUBLICATIONS

PCT Search Report and Written Opinion mailed Apr. 18, 2016 for PCT Application No. PCT/US15/64490, 12 pages.

Office action for U.S. Appl. No. 14/327,086, mailed on Feb. 12, 2016, Liu et al., "Cellular Network Backhaul Oversubscription", 6 pages.

PCT Search Report and Written Opinion mailed Oct. 14, 2015 for PCT Application No. PCT/US15/39324, 10 pages.

Office action for U.S. Appl. No. 14/575,451, mailed on Jun. 30, 2016, Liu et al., "Dynamic Bandwidth Scheduling with Transport Network", 21 pages.

\* cited by examiner

TUNNELING WITH ROUTING FOR TRANSPORT NETWORK

RELATED APPLICATIONS

This application is related to U.S. application Ser. No. 14/327,086, filed on Jul. 9, 2014, and entitled "Cellular Network Backhaul Oversubscription," the entirety of which is incorporated herein by reference. This application is also related to U.S. application Ser. No. 14/575,451, filed concurrently, and entitled "Dynamic Bandwidth Scheduling with Transport Network," the entirety of which is incorporated herein by reference.

BACKGROUND

Mobile network operators utilize Alternative Access Vendors (AAVs) to extend their network to areas that the operators' networks do not cover. An AAV provides a wide area networking network interface (e.g., a user network interface, or "UNI") and provides a virtual circuit between the mobile cellular location and the carrier's core network. The networking interface may be Carrier Ethernet, Multiprotocol Label Switching (MPLS), Frame Relay, Asynchronous Transfer Mode (ATM), or other interface type that supports virtual circuits or virtual channels (VC).

A VC is provisioned with a committed data rate (CDR), also called a committed information rate (CIR), which is specified in a service level agreement (SLA). A peak information rate (PIR) is the maximum burst speed allowed on the VC, with packets that exceed the CIR up to the PIR being "best effort" and therefore non-guaranteed. The carrier and the AAV typically employ policers at the UNI handoff to monitor and shape throughput to conform to the CIR and/or PIR.

IEEE 802.1ad is a standard commonly known as Q-in-Q tunneling; in this technique, an outer Virtual Local Area Network (VLAN) tag for a first network and an inner VLAN tag for a second network are added to an Ethernet frame. In a typical network backhaul or other transport arrangement with carrier Ethernet, the outer VLAN tag enables the carrier Ethernet switch to separate one customer's traffic from another customer's traffic, even if both customers utilize the same inner VLAN tags for use in their respective networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The disclosure describes a tunneling technique for a carrier transport environment. An outer VLAN tag identifies a customer's (e.g., a mobile network operator's) network to a first carrier Ethernet provider, and an inner VLAN tag identifies the customer's network to a second carrier Ethernet provider. The two carrier networks interface using a network-to-network interface (NNI). In a conventional cellular cluster transport arrangement, each cellular site of the cellular cluster would have its own VC, and the customer edge equipment would pass traffic to each cellular site based on the VC that the traffic arrives on. In embodiments of the present disclosure, the customer is a mobile network operator utilizing a single VC to couple a mobile core network to a cellular cluster. The VC may have oversubscribed CIR, such as is described in U.S. application Ser. No. 14/327,086, filed on Jul. 9, 2014, and entitled "Cellular Network Backhaul Oversubscription."

Regardless of whether or not the CIR is oversubscribed, where a single VC is used to connect multiple cell sites of a cellular cluster to a core network, a solution of some kind is employed to direct traffic arriving on the single VC to the appropriate cellular site. In embodiments of the present disclosure, one such solution is Q-in-Q tunneling, with an outer VLAN tag that identifies the provider's network to a carrier network, and an inner VLAN tag that is used internally by the cellular cluster provider edge to identify the cellular site (e.g., each cellular site is assigned a unique inner VLAN tag).

In embodiments of the present disclosure, where there are two carrier transport networks, such as in a rural area where a primary carrier's network does not extend, Internet Protocol (IP) or other layer 3 routing is utilized along with Q-in-Q tunneling. An outer VLAN tag identifies the customer's (e.g., the cellular provider's) network to a first carrier network. The first transport carrier network passes the data frames to a second transport carrier network, which utilizes the inner VLAN tag to identify the customer's network. A customer router receives the data frames, and utilizes layer-3 routing rather than layer-2 switching to direct the traffic to the appropriate cellular sites.

The following description makes reference to layers of the Open Systems Interconnection (OSI) model. Such references are for ease of description only. Networking protocols, standards, and specifications utilized by embodiments are not limited to those that comply fully with the OSI model, or with certain layers of the OSI model. For example, as used herein, Ethernet, Frame Relay, and Asynchronous Transfer Mode (ATM) are considered to operate at layer 2 of the OSI model, while Internet Protocol (IP) is considered to operate at layer 3 of the OSI model. Layer 2 network communications are generally referred to herein as "frames" or "cells," while layer 3 communications are generally referred to herein as "packets." Protocols may be considered to operate partly at other layers of the OSI model, or to operate in a way that has no analog to the OSI model; for example the combination of Transport Control Protocol and IP (TCP/IP) may be considered to operate at layers 3 and 4 of the OSI model. Thus, the descriptions of any protocols, standards, or specifications as operating at either layer 2 or layer 3 of the OSI model, or the description of "frames," "cells," or "packets" are not meant to limit the scope of embodiments of the present disclosure.

Example Transport Environment

Figure 1:
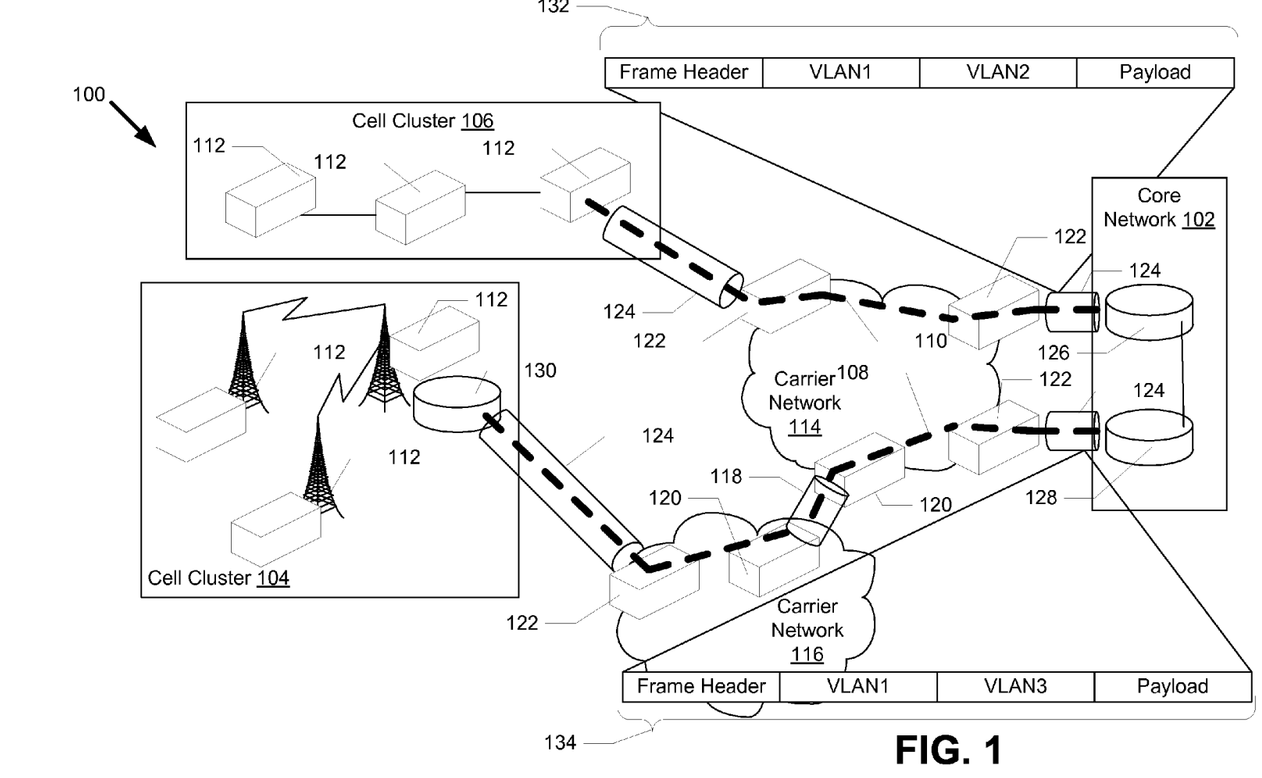
FIG. 1 illustrates an environment for providing Q-in-Q tunneling with routing in a network transport arrangement.

FIG. 1 illustrates an environment 100 for providing Q-in-Q tunneling with routing in a network transport arrangement. A core network 102 is coupled to both a cell cluster 104 and a cell cluster 106 via virtual channels (VC) 108 and 110, respectively. The cell cluster 104 includes multiple microwave-connected cell sites 112. The cell cluster 106 includes multiple cell sites 112 that are coupled via wired connections, such as in a campus environment. Embodiments are not limited by cell clusters of any type or types, and the two different types of cellular clusters are included in FIG. 1 for the sake of illustration only. Cell clusters may have both wired and wireless connections between cell sites 112; the cell clusters may all be wired, or they may all be wireless. The cell sites 112 may support one or more of GSM, CDMA, Wi-Fi, WiMax, LTE, or other wireless transceiver station types configured to communicate with wireless end-user devices, such as mobile telephone handsets, tablet computers, wireless modems, personal computers, laptops, and so forth. The core network 102 may provide to the wireless end-user devices one or more of voice service, video service, data service, messaging service (e.g., short messaging service (SMS), multimedia messaging service (MMS)), or other wireless services. The cell sites 112 include in various embodiments, a Universal Mobile Telecommunications System Third Generation (UMTS 3G) base station (e.g., a NodeB), a fourth generation (4G), Evolved Node B (e.g., an eNodeB), or other device. Each cell site 112 may support more than one type of voice and/or data connections for wireless end-user devices.

Figure 2:
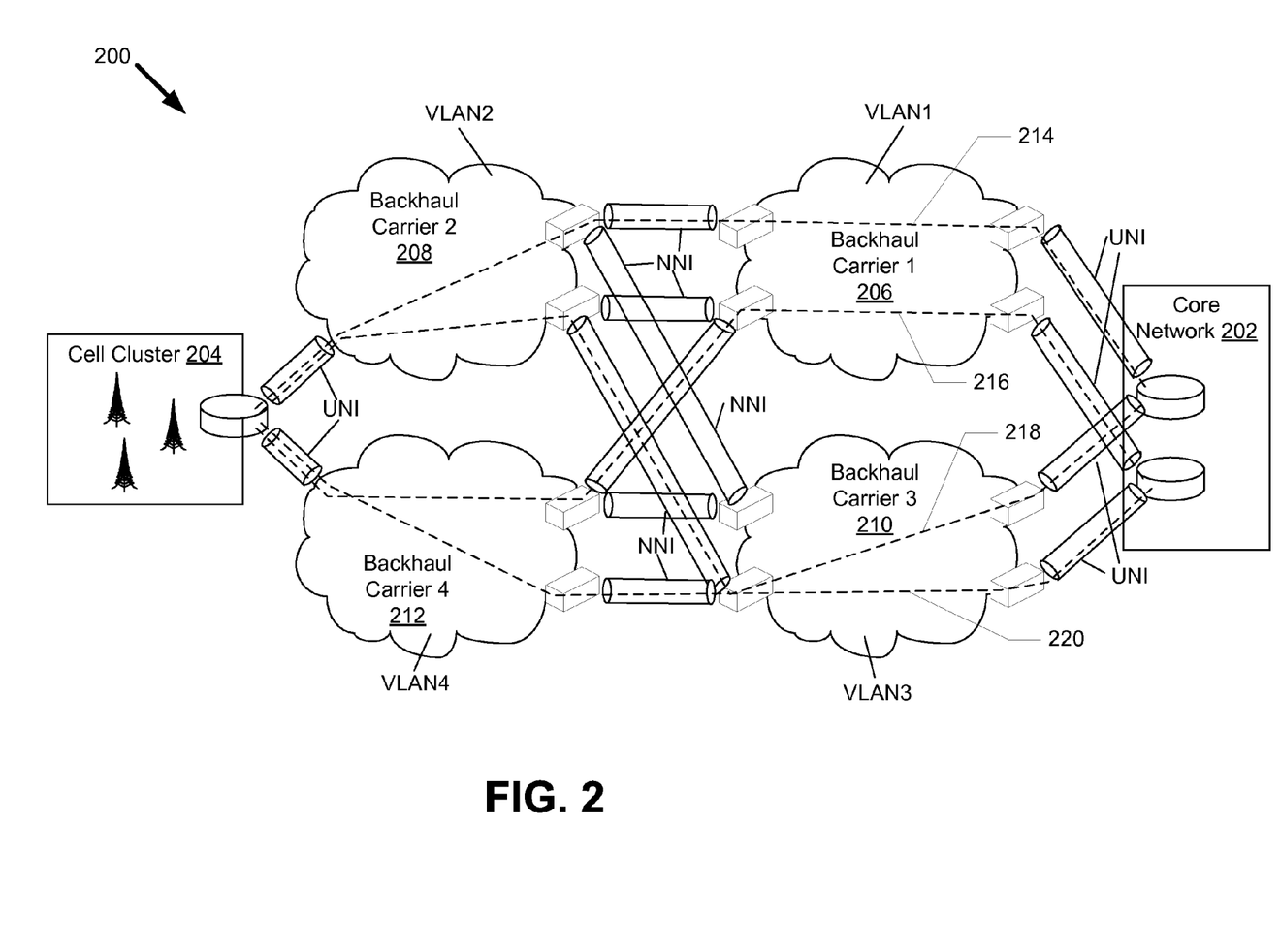
FIG. 2 illustrates an environment with a multi-carrier tunneling transport arrangement with fault-tolerance.

Environment 100 includes a first carrier network 114 and a second carrier network 116. In embodiments, additional carrier networks may be present, such as is illustrated in FIG. 2. The first carrier network 114 and the second carrier network 116 are coupled via a network-to-network interface (NNI) 118.

The VC 110 couples the core network 102 to the cell cluster 106. VC 110 traverses a single carrier network, the first carrier network 114. The VC 108 couples the core network 102 to the cell cluster 104, and traverses two carrier networks, the first carrier network 114 and the second carrier network 116. In some embodiments, the connection between the core network 102 and the cell cluster 104 may be over two VCs, with a handoff between the two VCs occurring at the NNI 118. This description treats the connection between the core network 102 and the cell cluster 104 as a single VC for the sake of illustration only.

The NNI 118 enables provider edge (PE) equipment 120 to carry traffic between the first carrier network 114 and the second carrier network 116. PE 122 terminates user-to-network interfaces (UNIs) 124 with the core network 102, via core network devices 126 and 128, as well as the cell cluster 104 and the cell cluster 106, via cell cluster devices, such as by a cell site 112 device of the cell cluster 106 (or other device of the cell cluster 106) and the cell cluster router 130 of the cell cluster 104.

Upon receiving a packet having a network address (such as an IP address) of a device within the cell cluster 106, the core network device 126 performs a look-up to a routing table, and determines that the next hop is a cell site 112 device in the cell cluster 106. The core network device 126 forms a frame 132, such as a layer 2 frame (e.g., an Ethernet frame). The frame 132 includes a frame header, an outer VLAN tag (VLAN1), an inner VLAN tag (VLAN2), and a payload. The core network device 126 places the packet (e.g., an IP packet) into the payload of the frame 132. The core network device 126 forwards the frame 132 to the PE 122 of the carrier network 114.

The outer VLAN1 tag is a VLAN tag utilized by the carrier network 114 to identify a network associated with the cell cluster 106. Upon receiving the frame 132, the PE 122 identifies the VLAN1 tag as belonging to the cell cluster 106 and forwards it over the VC 110 to the cell cluster 106. When a cell site 112 device of the cell cluster 106 receives the frame 132, it utilizes the inner VLAN2 tag of the frame 132 to identify the cell site 112 device that the frame 132 is destined for and forwards it accordingly. This forwarding by the cell site 112 device is performed at layer-2; e.g., as Ethernet switching or other layer-2 forwarding, including tunneling the frame using layer-3 routing. Upon receipt, the destination cell site 112 extracts the layer-3 packet (e.g., an IP packet) and utilizes routing to forward the packet to the destination UE device.

The above example is an example of utilizing Q-in-Q over a carrier network transport with a single carrier network. In the below example, Q-in-Q tunneling is utilized with two carrier networks in a transport arrangement.

Upon receiving a packet having a network address (such as an IP address) of a device within the cell cluster 104, the core network device 128 performs a look-up to a routing table, and determines that the next hop is the cell cluster router 130 of the cell cluster 104. The core network device 128 forms a frame 134, such as a layer 2 frame (e.g., an Ethernet frame). The frame 134 includes a frame header, an outer VLAN tag (VLAN1), an inner VLAN tag (VLAN3), and a payload. The core network device 128 places the packet (e.g., an IP packet) into the payload of the frame 134. The core network device 128 forwards the frame 134 to the PE 122 of the carrier network 114.

The outer VLAN1 tag is a VLAN tag utilized by the carrier network 114 to identify a network associated with the cell cluster 104. The inner VLAN3 tag is a VLAN tag utilized by the carrier network 116 to identify the network associated with the cell cluster 104. Upon receiving the frame 134, the PE 122 identifies the VLAN1 tag as belonging to a network associated with the cell cluster 106 and forwards it over the VC 108 to the NNI 118, where the PE 120 passes the frame 134 to the carrier network 116. Upon receiving the frame 134, the PE 120 of the carrier network 116 identifies the VLAN3 tag as belonging to the network associated with the cell cluster 104. The frame 134 is forwarded over the VC 108, by the carrier network 116, to the UNI 124 and transmitted to the cell cluster router 130.

The cell cluster router 130 extracts the layer-3 packet (e.g., an IP packet) from the payload of the frame 134 and utilizes routing to identify the next hop for the packet, which may be one of the cell sites 112 of the cell cluster 104, and forwards the packet to the next hop. The destination cell site utilizes routing to forward the packet to the destination UE device identified by the network address of the packet.

Unlike with cell cluster 106, where the inner VLAN tag is utilized to switch frames within the cell cluster 106, the inner VLAN tag is utilized by the carrier network 116 to switch frames over the VC 108 to the cell cluster router 130. Each cell site may have an IP subnet associated with it (or more generally, an IP network address associated with it) such that traffic destined for the cell site can be routed based on the network portion of the destination IP address.

FIG. 2 illustrates an environment 200 with a multi-carrier tunneling transport arrangement with fault-tolerance. Environment 200 includes a cell cluster 204 and a core network 202, which may be the same as or similar to the cell cluster 104 and the core network 102 of FIG. 1, respectively. Environment 200 includes four transport carriers 206, 208, 210, and 212. Fewer or more transport carriers may be present without departing from the scope of embodiments.

In the environment 200, four VCs are established to connect core network 202 to the cell cluster 204. In this arrangement, there is both carrier redundancy and VC redundancy. Q-in-Q tunneling is utilized by the core network 202 and the cell cluster 204 to select a transport path. For example, transport carrier 206 may be associated with a VLAN1 tag, transport carrier 208 may be associated with a VLAN2 tag, transport carrier 210 may be associated with a VLAN3 tag, and transport carrier 212 may be associated with a VLAN4 tag. Routers in the core network 202 and the cell cluster 204 select a VC to one another based on various factors. For example, performance metrics, such as delay, jitter, packet loss ratios, and so forth may be utilized to select a VC. A first traffic type may be selected to take one VC, while another traffic type is selected to take another VC. In one example, voice traffic may be selected to take a VC with low jitter, while data traffic may be selected to take another VC with low packet loss. In some embodiments, one VC (or multiple VCs) may be primary VCs, with other VCs serving as redundant VCs that are used during an outage, during a period of unexpectedly large traffic volume, or in some other situation.

Routers in the cell cluster 204 and the core network 202 select a VC by using VLAN tags. For example, to select VC 214, a router in the core network 202 would form a frame having an outer tag of VLAN1 and an inner tag of VLAN2. In another example, to select VC 216, a router in the cell cluster 204 would form a frame having an outer VLAN tag of VLAN4 and an inner VLAN tag of VLAN1. Similarly, to select VC 218, a router in the core network 202 forms a frame having an outer VLAN tag of VLAN3 and an inner VLAN tag of VLAN2. And to select VC 220, a router in the cell cluster 204 would form a frame having an outer VLAN tag of VLAN4 and an inner VLAN tag of VLAN3.

The VCs 214-220 may be provisioned with CIR. The CIR may be oversubscribed such that an aggregate CIR for one or more of the VCs is an oversubscribed CIR that is based on historical data showing the combined traffic for voice, data, video, or other traffic of the cell cluster 204, such as is described in U.S. application Ser. No. 14/327,086, referenced above. In one example, each of VCs 214-220 may individually have a CIR that is oversubscribed and sufficient to handle the combined traffic of the cell cluster 204, so that any one of them is able provide connectivity between the core network 202 and the cell cluster 204. In another example, an aggregated CIR for VC 214 and 216 is oversubscribed and sufficient to handle the combined traffic of the cell cluster 204, so that they together are able provide connectivity between the core network 202 and the cell cluster 204. In another example, an aggregated CIR for VCs 214-220 is oversubscribed and sufficient to handle the combined traffic of the cell cluster 204, so that they together are able provide connectivity between the core network 202 and the cell cluster 204. Embodiments are not limited to oversubscribed CIRs.

Example Processes

Figure 3:
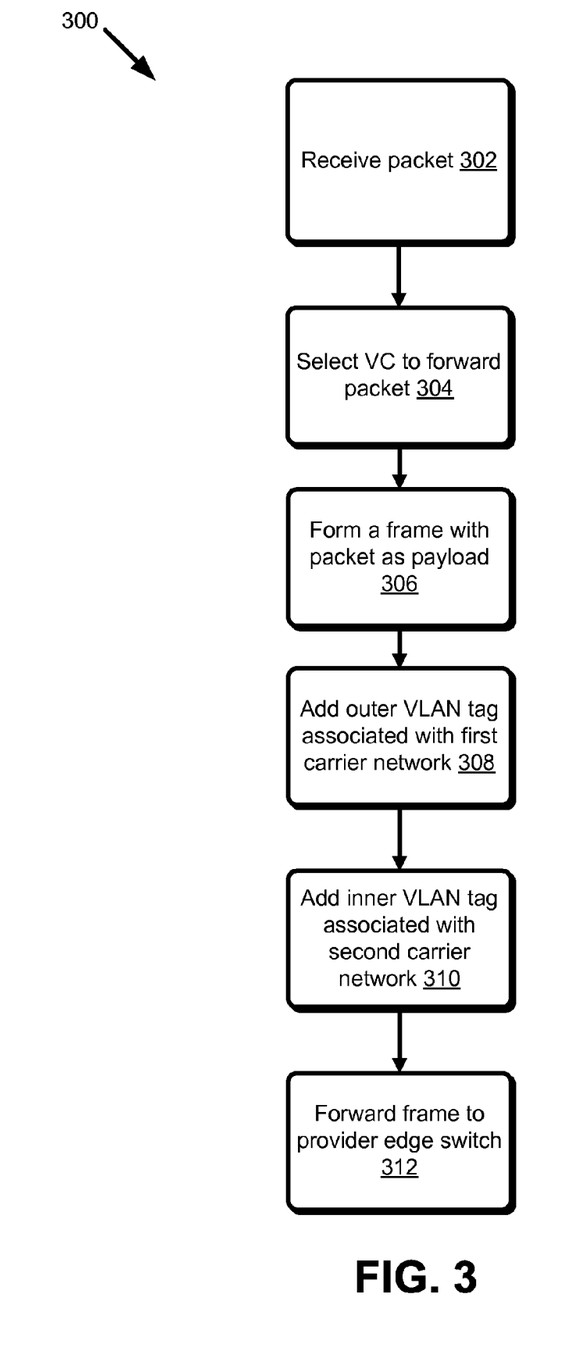
FIG. 3 illustrates a flow chart of an example process for multi-carrier network transport with a single VC to a cellular cluster.

FIG. 3 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates a flow chart of an example process 300 for multi-carrier network transport with a single VC to a cellular cluster. At 302, a network device, such a core network device or a cell cluster network device, receives a packet having a network (e.g., an IP) destination address that is reachable over a carrier transport network, via one or more VCs. The network device may be a cell cluster router, such as the cell cluster router 130. The network device may be a core network router, such as the core network devices 126 and 128.

At 304, the network device selects a VC over which to forward the received packet. Selecting the VC may be based on various factors. In some embodiments, there may be a default VC over which all traffic is passed and a backup VC that is used in the event that the default VC suffers poor conditions or failure. In some embodiments, one or more network performance characteristics such as packet loss statistics, packet delay, jitter, or other performance indicator(s) are used to select a VC. As discussed above, the VC may be provisioned with a committed information rate (CIR) that is determined based on aggregated traffic for a plurality of destination cellular sites of the cellular cluster.

At 306, the network device forms a frame and places the IP packet into a payload portion of the frame. In embodiments, the frame may be an Ethernet frame, such as a frame that complies with the IEEE 802.3 standard, although other types of Ethernet frames may be used without departing from the scope of embodiments. In various other embodiments, the frame may be a Multiprotocol Label Switching (MPLS) frame, a frame relay frame, an asynchronous transfer mode (ATM) cell, or other media access control (MAC) frame.

At 308, the network device adds an outer VLAN tag to the frame that identifies a network of the destination, such as the core network or the core network, to a first carrier network. At 310, the network device adds an inner VLAN tag to the frame that identifies the network of the cellular cluster to a second carrier network. In some embodiments, one or more of the frame, the first VLAN tag, and the second VLAN tag conform to IEEE 802.1ad. Where redundancy is built into the carrier transport network arrangement, selection of the combination of inner and outer VLAN tags is based on the carrier networks over which the frame is transported, such as is described with respect to FIG. 2.

At 312, the network device forwards the frame, including the IP packet, to a provider edge switch of the first carrier network. The first carrier network utilizes the outer VLAN tag to determine the VC over which to transmit the traffic. The VC passes through an NNI between the first and second carrier networks. The second carrier network utilizes the inner VLAN tag to forward the traffic to the customer (e.g., mobile provider) network.

Example Computing System

Figure 4:
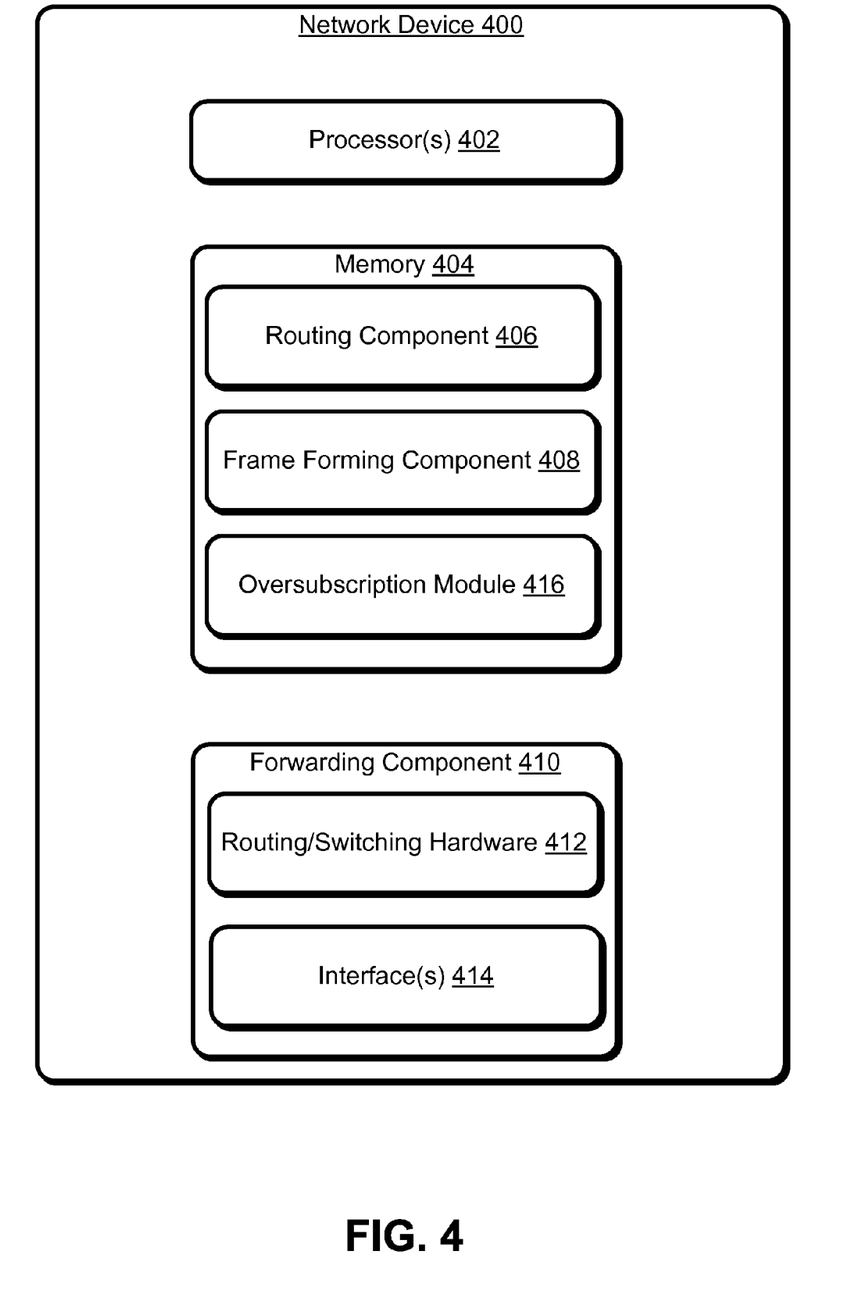
FIG. 4 illustrates an example network device configured to forward tunneling frames in a carrier transport environment.

FIG. 4 illustrates an example network device 400 configured to forward tunneling frames in a carrier transport environment. The network device 400 may be a core network device, such as the core network devices 126 and 128, or a cellular cluster device, such as the cell cluster router 130. As illustrated in FIG. 4, the network device 400 includes processor(s) 402 and memory 404.

The memory 404 includes a routing component 406 executable by the processor(s) 402 to receive a packet having a destination address at a destination cellular site of the cellular cluster, and to select a virtual circuit over which to forward the packet. Selection of the VC is, in embodiments, based on a look-up to a routing table, based on network monitoring, or some combination of the two. The routing table may be determined in part on a routing algorithm. Selection of the VC is, in some embodiments, based on monitored or measured real-time or near real-time network characteristics, such as packet delay, packet loss statistics, packet jitter, and so forth. The packet may be an IP packet having a destination IP address. Where redundancy is built into the carrier transport network (e.g., where there is transport carrier redundancy and/or VC redundancy), the selection of the VC may be based on a network outage or other network fault condition. In some embodiments, a first type of network traffic is forwarded on one VC and a second type of network traffic is forwarded on a second VC, as discussed elsewhere within this Detailed Description.

The memory 404 includes a frame forming component 408 that is executable by the processor(s) 402 to form a frame and place the packet into a payload portion of the frame. In embodiments, the frame may be an Ethernet frame, such as a frame that complies with the IEEE 802.3 standard, although other types of Ethernet frames may be used without departing from the scope of embodiments. In various other embodiments, the frame may be a Multiprotocol Label Switching (MPLS) frame, a frame relay frame, an asynchronous transfer mode (ATM) cell, or other media access control (MAC) frame.

The frame forming component 408 is executable by the processor(s) 402 to add an outer VLAN tag to the frame that identifies a network of the cellular cluster to the first carrier network, and to add an inner VLAN tag to the frame that identifies the network of the cellular cluster to a second carrier network. In embodiments, such as where redundant transport carriers are provisioned within the transport network, the VLAN tags are selected based on the VC determined by the routing component 406.

The network device 400 includes a forwarding component 410 configured to forward the frame, including the packet, to the provider edge switch of the first carrier network. The forwarding component 410 includes routing/switching hardware 412 and one or more physical interfaces, such as a physical interface 414 configured to interface with a provider edge switch of a first carrier network.

Although the network device 400 is illustrated in FIG. 4 as having software components stored in memory 404 and a hardware forwarding component 410, some or all functions of the routing component 406 and/or the frame forming component 408 may be performed within hardware, such as within the routing/switching hardware 412. The memory 404 may include one or more configuration files that configure the routing/switching hardware 412 of the network device 400 to perform one or more functions of the routing component 406 and/or the frame forming component 408 that are described above.

In some embodiments, the network device 400 includes an oversubscription module 416, such as is described in U.S. application Ser. No. 14/327,086, filed on Jul. 9, 2014, and entitled "Cellular Network Backhaul Oversubscription," the entirety of which is incorporated herein by reference. The oversubscription module 416 is configured to determine, based on peak throughput values of combined voice and data traffic, and based on a predetermined performance threshold, an oversubscription metric for a committed information rate of the virtual circuit. In some embodiments, the oversubscription module is configured to determine the throughput peaks over a plurality of time periods (such as over hourly, daily, weekly, monthly, or other time periods). This determination may be based on a mean peak and a standard deviation of the throughput peaks, under an assumption that such peaks conform to a normal distribution.

In some embodiments, the processor(s) 402 is a central processing unit (CPU), a graphics processing unit (GPU), or both CPU and GPU, or any other sort of processing unit. Each of the one or more processor(s) 402 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 402 may also be responsible for executing all computer applications stored in the memory 404, which can be associated with common types of volatile (RAM) and/or nonvolatile (ROM) memory.

In various embodiments, memory 404 may include system memory, which may be volatile (such as RAM), non-volatile (such as ROM, flash memory, etc.) or some combination of the two. The memory 404 may also include additional data storage devices (removable and/or non-removable) such as, for example, magnetic disks, optical disks, or tape.

Memory 404 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the network device 400. Any such non-transitory computer-readable media may be part of the network device 400.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of routing traffic to a cellular cluster over multiple carrier networks, the method comprising:
    receiving an Internet Protocol (IP) packet having a destination IP address of a destination cellular site of the cellular cluster, the cellular cluster including multiple cellular sites;
    forming a frame and placing the IP packet into a payload portion of the frame;
    adding an outer Virtual Local Area Network (VLAN) tag to the frame, the outer VLAN tag identifying a network of the cellular cluster to a first carrier network;
    adding an inner VLAN tag to the frame, the inner VLAN tag identifying the network of the cellular cluster to a second carrier network, the first carrier network and the second carrier network coupled via at least one network-to-network interface; and forwarding the frame, including the IP packet, to a provider edge switch of the first carrier network, wherein the first carrier network and the second carrier network carry traffic to the cellular cluster over a virtual circuit, and wherein the virtual circuit is provisioned with a committed information rate (CIR) that is specific to the virtual circuit and is determined based on aggregated traffic for a plurality of destination cellular sites of the cellular cluster.

2. The method of claim 1, wherein the frame is an Ethernet frame.

3. The method of claim 1, wherein the frame, the first VLAN tag, and the second VLAN tag conform to IEEE 802.1ad.

4. A network device for routing traffic to a cellular cluster, the network device comprising:
a first physical interface configured to interface with a provider edge switch of a first carrier network;
one or more processors;
a memory coupled do the one or more processors and storing:
a routing component executable by the one or more processors to receive a packet having a destination address at a destination cellular site of the cellular cluster, the cellular cluster including multiple cellular sites, and to select a virtual circuit over which to forward the packet;
a frame forming component executable by the one or more processors to:
form a frame;
place the packet into a payload portion of the frame;
add an outer Virtual Local Area Network (VLAN) tag to the frame, the outer VLAN tag identifying a network of the cellular cluster to the first carrier network; and
add an inner VLAN tag to the frame, the inner VLAN tag identifying the network of the cellular cluster to a second carrier network, the first carrier network and the second carrier network coupled via at least one network-to-network interface; and
a hardware forwarding component configured to forward the frame, including the packet, to the provider edge switch of the first carrier network,
wherein the first carrier network and the second carrier network carry traffic to the cellular cluster over the virtual circuit,
wherein the virtual circuit is provisioned with a committed information rate (CIR) that is specific to the virtual circuit and is determined based on aggregated traffic for a plurality of destination cellular sites of the cellular cluster.

5. The network device of claim 4, wherein the frame is an Ethernet frame, and the virtual circuit is a carrier Ethernet virtual circuit.

6. The network device of claim 4, wherein:
the virtual circuit is one of a plurality of virtual circuits that couple the network device to the cellular cluster;
the virtual circuit is a first one of the plurality of virtual circuits, and a second one of the plurality of virtual circuits is carried by at least a third carrier network;
the routing component is further executable by the one or more processors to select the second one of the plurality of virtual circuits over which to forward the packet; and
the frame forming component is further executable by the one or more processors to add, responsive to the routing component selecting the second one of the virtual circuits, another outer Virtual Local Area Network (VLAN) tag to the frame, the outer VLAN tag identifying the network of the cellular cluster to the third carrier network.

7. The network device of claim 6, wherein the network-to-network interface is a first network-to-network interface, and the frame forming component is further executable by the one or more processors to add one of:
the inner VLAN tag to the frame, the inner VLAN tag identifying the network of the cellular cluster to the second carrier network, the third carrier network and the second carrier network coupled via at least a second network-to-network interface, or
another inner VLAN tag to the frame, the other VLAN tag identifying the network of the cellular cluster to a fourth carrier network, the fourth carrier network and the third carrier network coupled via at least a third network-to-network interface.

8. The network device of claim 6, wherein the first one of the plurality of virtual circuits is provisioned with a first committed information rate (CIR), the second one of the plurality of virtual circuits is provisioned with a second CIR, wherein one of the first CIR, the second CIR, or a sum of the first CIR and the second CIR is determined based on aggregated traffic for a plurality of destination cellular sites of the cellular cluster.

9. One or more non-transitory computer-readable media comprising instructions that are executable by one or more processors of a network device to:
receive a packet having a destination address of a destination cellular site of a cellular cluster, the cellular cluster including multiple cellular sites;
form a frame and place the packet into the payload of the frame;
add an outer Virtual Local Area Network (VLAN) tag to the frame, the outer VLAN tag identifying a network of the cellular cluster to a first carrier network;
add an inner VLAN tag to the frame, the inner VLAN tag identifying the network of the cellular cluster to a second carrier network, the first carrier network and the second carrier network coupled via at least one network-to-network interface; and
forward the frame, including the packet, to a provider edge switch of the first carrier network,
wherein the first carrier network and the second carrier network carry traffic to the cellular cluster over a virtual circuit, and
wherein the virtual circuit is provisioned with a committed information rate (CIR) that is specific to the virtual circuit and is determined based on aggregated traffic for a plurality of destination cellular sites of the cellular cluster.

10. The one or more non-transitory computer-readable media of claim 9, wherein the frame, the first VLAN tag, and the second VLAN tag conform to IEEE 802.1ad.

11. The one or more non-transitory computer-readable media of claim 9, wherein:
the virtual circuit is one of a plurality of virtual circuits that couple the network device to the cellular cluster;
the virtual circuit is a first one of the plurality of virtual circuits and a second one of the plurality of virtual circuits is carried by at least a third carrier network; and
the instructions are further executable by the one or more processors of the network device to:
select the second one of the plurality of virtual circuits over which to forward the packet; and add, responsive to selection of the second one of the virtual circuits, another outer Virtual Local Area Network (VLAN) tag to the frame, the outer VLAN tag identifying the network of the cellular cluster to the third carrier network.

12. The one or more non-transitory computer-readable media of claim 11, wherein:
the network-to-network interface is a first network-to-network interface; and
the instructions are further executable by the one or more processors of the network device to add one of:
the inner VLAN tag to the frame, the inner VLAN tag identifying the network of the cellular cluster to a second carrier network, the third carrier network and the second carrier network coupled via at least a second network-to-network interface, or
another inner VLAN tag to the frame, the other VLAN tag identifying the network of the cellular cluster to a fourth carrier network, the fourth carrier network and the third carrier network coupled via at least a third network-to-network interface.

13. The one or more non-transitory computer-readable media of claim 9, wherein the multiple cellular sites include the destination cellular site, and wherein each of the multiple cellular sites are associated with their own subnets.

14. The one or more non-transitory computer-readable media of claim 9, wherein the virtual circuit is one of a plurality of virtual circuits that couple the network device to the cellular cluster;
the virtual circuit is a first one of the plurality of virtual circuits and a second one of the plurality of virtual circuits is carried by at least a third carrier network; and
the first one of the plurality of virtual circuits is provisioned with a first committed information rate (CIR), a second one of the plurality of virtual circuits is provisioned with a second CIR, wherein one of the first CIR, the second CIR, or a sum of the first CIR and the second CIR is determined based on aggregated traffic for a plurality of destination cellular sites of the cellular cluster.

* * * * *